(12) United States Patent
Togasaki (10) Patent No.: US 7,376,953 B2
(45) Date of Patent: May 20, 2008

(54) APPARATUS AND METHOD FOR ROUTING A TRANSACTION TO A SERVER

(75) Inventor: Shinobu Togasaki, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 726 days.

(21) Appl. No.: 10/020,355

(22) Filed: Oct. 29, 2001

(65) Prior Publication Data
US 2003/0088672 A1    May 8, 2003

(51) Int. Cl.
G06F 9/46       (2006.01)
G06F 15/16      (2006.01)
G06F 15/173     (2006.01)

(52) U.S. Cl. .................. 718/105; 709/219; 709/238

(58) Field of Classification Search ........ 709/200–253; 714/1–57; 719/311; 707/1–10; 715/733, 715/738; 718/104, 105
See application file for complete search history.

(56) References Cited

U.S. PATENT DOCUMENTS

| | | | | |
|---|---|---|---|---|
| 5,864,679 | A * | 1/1999 | Kanai et al. ................. | 709/238 |
| 6,092,178 | A * | 7/2000 | Jindal et al. ................. | 712/27 |
| 6,128,657 | A * | 10/2000 | Okanoya et al. ............ | 709/224 |
| 6,173,322 | B1 * | 1/2001 | Hu ............................... | 709/224 |
| 6,424,992 | B2 * | 7/2002 | Devarakonda et al. ...... | 709/203 |
| 6,681,244 | B1 * | 1/2004 | Cross et al. ................. | 709/203 |
| 2002/0083174 | A1 * | 6/2002 | Hayashi et al. ............. | 709/225 |
| 2002/0161917 | A1 * | 10/2002 | Shapiro et al. ............. | 709/238 |

OTHER PUBLICATIONS

U.S. Appl. No. 09/751,009, filed Dec. 29, 2000, entitled "Apparatus and Method for Identifying a Requested Level of Service for a Transaction" of Raja Daoud and Francisco J. Romero, 30 pp.
U.S. Appl. No. 09/493,753, filed Jan. 28, 2000, entitled "Dynamic Management of Computer Workloads Through Service Level Optimization" of Clifford A. McCarthy and Raja Daoud, 43 pp.
Hewlett Packard Company, "HP Process Resource Manager C.01.08.2", Dec. 2000, 16 pp.
U.S. Appl. No. 09/751,011, filed Dec. 29, 2000, entitled "Apparatus and Method for Routing a Transaction Based on a Requested Level of Service" of Francisco J. Romero, 24 pp.
U.S. Appl. No. 09/799,662, filed Mar. 6, 2001, entitled "Apparatus and Method for Routing a Transaction to a Partitioned Server" of Francisco J. Romero and Raja Daoud, 23 pp.

* cited by examiner

*Primary Examiner*—William Thomson
*Assistant Examiner*—Charles E Anya (57) ABSTRACT

Apparatus and method for routing a transaction to a server. The apparatus may be embodied in computer readable program code stored on computer readable storage media. Preferred embodiments may comprise identifying at least one attribute-based category for the transaction, identifying at least one of a plurality of servers to process the transaction based at least in part on the identified attribute-based category of the transaction, and routing the transaction to one of the at least one identified servers.

21 Claims, 8 Drawing Sheets

APPARATUS AND METHOD FOR ROUTING A TRANSACTION TO A SERVER

FIELD OF THE INVENTION

The invention generally pertains to routing transactions to computers, and more specifically, to routing transactions to servers based on attribute-based categories.

BACKGROUND OF THE INVENTION

Multiple servers are often provided on networks, including the Internet, to handle large volumes of transactions. These servers may be arranged as "front-end" servers and "back-end" to enhance network performance. That is, front-end servers may be provided with the basic program code for performing simple or routine operations (e.g., basic database functions), while the back-end servers may be provided with program code for performing more complex operations (e.g., complex database functions) and/or for centrally maintaining information that is accessed by a plurality of users (e.g., an organization's database records).

By way of illustration, a simple transaction, such as sorting "gross sales" by "product", may be processed entirely at the front-end server. However, the front-end server may require additional resources from a back-end server to process a more complex transaction, such as a statistical comparison of "current sales" and "past sales". For example, the front-end server may request the "past sales" data and/or the program code for performing the statistical analysis thereof from the back-end server. Accordingly, the front-end server only accesses the "past sales" data and/or the statistical analysis program code on an as-needed basis.

As more than one server is available, it is desirable to route transactions to the various servers, and not to simply route all of the transactions to one server. Basic load balancers have been provided to balance a load on a plurality of front-end servers (i.e., route transactions to the various front-end servers). The problem with such basic load balancers, however, is that the characteristics of the particular transactions are not factored into the load balancing "decision".

More sophisticated load balancers (i.e., "workload managers") do factor in the needs of particular transactions, as well as the processing power of particular front-end servers, the available bandwidth for various front-end servers, the priorities associated with various transactions, etc. However, none of the available workload managers take into account the interplay between the front-end and back-end servers. Rather, these workload managers only manage workloads as if only the front-end servers exist.

By ignoring the interplay between the front-end and back-end servers, similar transactions are commonly routed to different front-end servers (e.g., the fastest front-end servers available when the transaction arrives at the workload manager). When the transactions can be processed entirely at the front-end server, the turn-around time is enhanced because the separate servers are used to process the transactions simultaneously. However, when the front-end servers require resources from one or more back-end servers, the performance of both the back-end and front-end servers declines. That is, the back-end server(s) can only respond to a request from one front-end server at a time, thus slowing the response to at least one of the front-end servers. In addition, when data is requested from the back-end server(s), the data may be stored in cache memory at each of the front-end servers that requested it. When these front-end servers need the cache to store other information (i.e., to process a different transaction), the cache is typically overwritten with the new information. Therefore, the front-end server must again request the prior information from the back-end server when it is needed again to process another transaction.

SUMMARY OF THE INVENTION

The inventor has recognized that the interplay between front-end and back-end servers can have a significant effect on the availability of front-end servers. For example, if a plurality of front-end servers each requires access to the same back-end server, the performance of the back-end server will decline. This, in turn, causes the performance of the front-end servers to decline as they wait for data from the back-end server. Alternatively, if a plurality of "N" front-end servers request the same data from a back-end server, then "N" copies of the data will be stored by each of the "N" front-end servers. This duplication of data storage by the front-end servers uses valuable resources, which might be better used for other purposes. To account for the effect of interplay between front-end and back-end servers on workload management, the inventor has devised an apparatus and a method for routing a transaction to a server based on attributes specific to the transaction itself.

An apparatus for routing a transaction to a server is preferably embodied in computer readable program code stored on computer readable storage media. The computer readable program code may comprise program code for identifying at least one attribute-based category for the transaction. Based at least in part on the identified attribute-based category, program code may identify at least one of the servers to process the transaction. Program code may also be provided for routing the transaction to one of the identified servers.

A method for routing a transaction to a server is also disclosed and may comprise the steps of: identifying at least one attribute-based category for the transaction, identifying at least one of the plurality of servers to process the transaction based at least in part on the identified attribute-based category of the transaction, and routing the transaction to one of the at least one identified servers.

BRIEF DESCRIPTION OF THE DRAWINGS

Illustrative and presently preferred embodiments of the invention are illustrated in the drawings, in which.

DESCRIPTION OF THE PREFERRED EMBODIMENT

Figure 2:
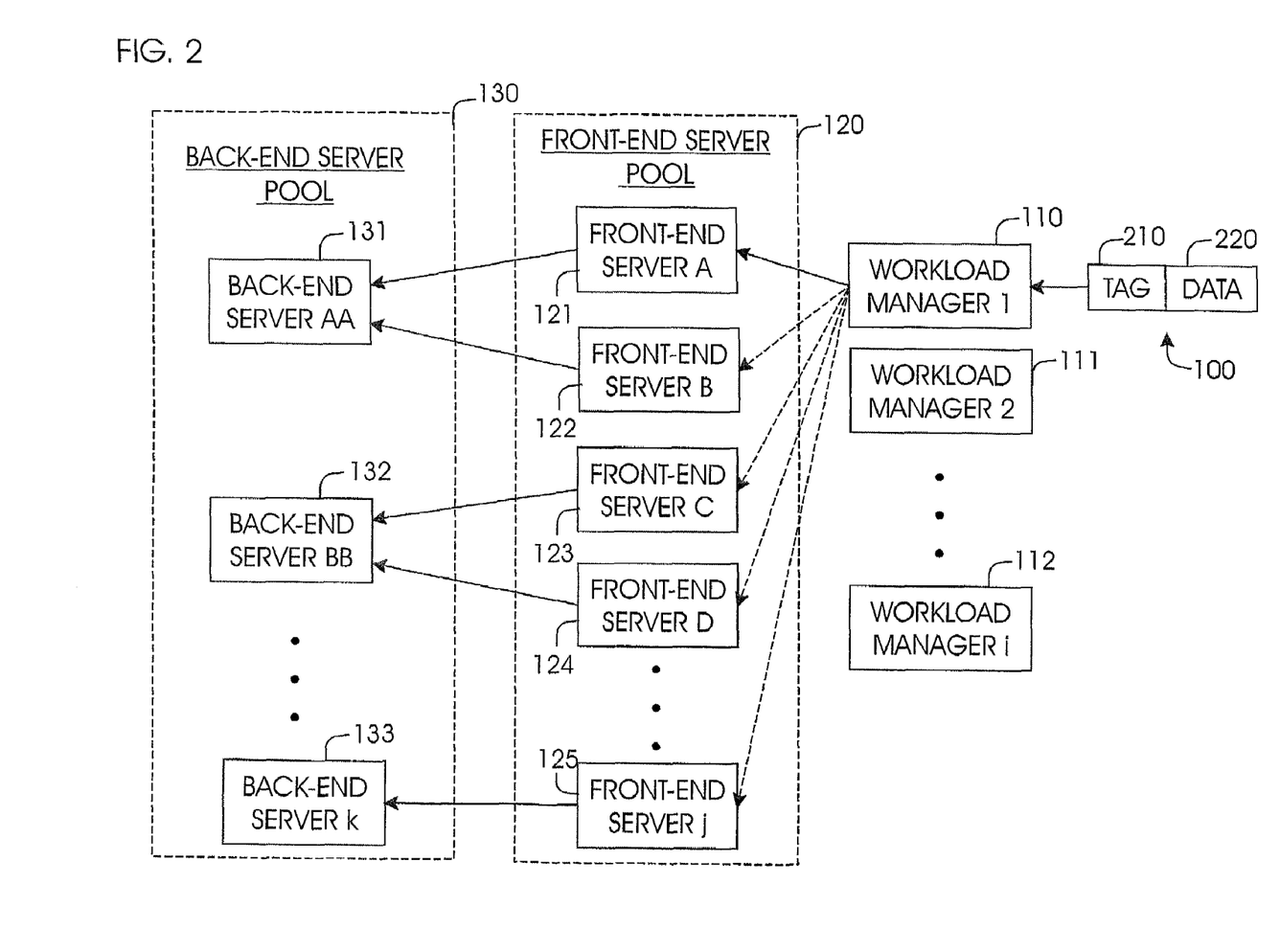
FIG. 2 is a high-level diagram illustrating another embodiment of apparatus for routing transactions to servers.

Apparatus for routing transactions 100 is shown and described herein as it could be used to route transactions 100 to a plurality of front-end servers 121, 122, 123, 124, and 125 (see FIG. 2). Briefly, multiple servers are often provided on networks (e.g., the Internet, Intranets, etc.) to handle large volumes of transactions 100. These servers may be classified as front-end servers 121-125 and back-end servers 131, 132, and 133. The front-end servers 121-125 may receive transactions 100, and request additional data, such as information in a spreadsheet that is stored on a back-end server, to process the transactions 100. However, when similar transactions 100 are routed to more than one of the front-end servers (e.g., 121 and 122), each of the front-end servers (e.g., 121 and 122) may request the same data from one or more of the back-end servers 131-133 to process the similar transactions 100. For example, one transaction 100 may be routed to a first front-end server 121, and a second (albeit similar) transaction 100 may be routed to another front-end server 122. Hence, both the front-end servers 121 and 122 may request the same data from one or more of the back-end servers 131-133, and store duplicate copies of the data in the cache of both of the front-end servers 121 and 122, so that both of the servers can process the respective transactions 100. It is thus apparent that routing similar transactions 100 to different front-end servers (e.g., 121 and 122) makes inefficient use of the resources of both the front-end servers (i.e., by consuming the cache at both with duplicate copies of the requested data) and the back-end servers (i.e., by expending processing power to fulfill duplicate requests). Therefore, it is desirable to route transactions 100 more efficiently.

According to the teachings of the invention, embodiments of apparatus may be provided for routing a transaction 100 to one of a plurality of servers. Preferably, the apparatus is embodied in computer readable program code stored on computer readable storage media. The computer readable program code may comprise program code for identifying at least one attribute-based category 410 (FIG. 4) for the transaction 100 (i.e., a category designated based on an attribute of the transaction itself). Preferably, the attribute-based category 410 is defined for the transaction 100 using a tag 210 (FIG. 2). For example, the tag 210 may indicate or define the attribute-based category 410 for the transaction 100 as a perceived attribute, such as "finance" or "marketing". Or for example, the tag 210 may indicate or define the attribute-based category 410 for the transaction 100 as a real attribute, such as "Database X", "Word Processing". In addition, program code may be provided for identifying at least one of the front-end servers 121-125 to process the transaction 100 based at least in part on the identified attribute-based category 410 of the transaction 100. For example, front-end Server B (122) may be identified for processing transactions 100 categorized as "finance", and front-end Server D (124) may be identified for processing transactions 100 categorized as "Database X". Furthermore, program code may be provided for routing the transaction 100 to one of the identified servers (e.g., front-end Server B (124)). Hence, for example, transactions 100 categorized as "Database X" are routed to front-end Server D (124), and transactions 100 categorized as "finance" are routed to front-end Server B (122).

Apparatus for routing a transaction 100 to a plurality of servers 121-125 may be operated as follows. An attribute-based category is preferably defined for the transaction 100. The transaction 100 may then be transmitted over the network and received by a workload manager 110. The attribute-based category 410 for the transaction may be identified at the workload manager 110, and at least one of the servers 121-125 may be identified to process the transaction 100 based at least in part on the identified attribute-based category 410 of the transaction 100. The transaction 100 may then be routed to one of the identified servers (e.g., front-end Server B 124) to be processed thereby.

Accordingly, users who are processing common data, do so with the same server. In other words, transactions 100 that are similar to one another are consistently routed to the same front-end server (e.g., consistently routed to front-end server 121). Thus, the data required from the back-end servers 131-133 to process these similar transactions 100 is only stored in the cache of the front-end server (e.g., 121) that has been designated to process these transactions 100 (and not in the caches of many or all servers), and fewer calls are required from the front-end servers 121-125 to the back-end servers 131-133. As a result, the server resources are more efficiently utilized, thereby enhancing the overall performance of all of the servers 121-125 and 131-133.

Having generally described apparatus and methods for routing transactions 100 to servers, embodiments of the apparatus and method of the invention will now be described in further detail.

Figure 1:
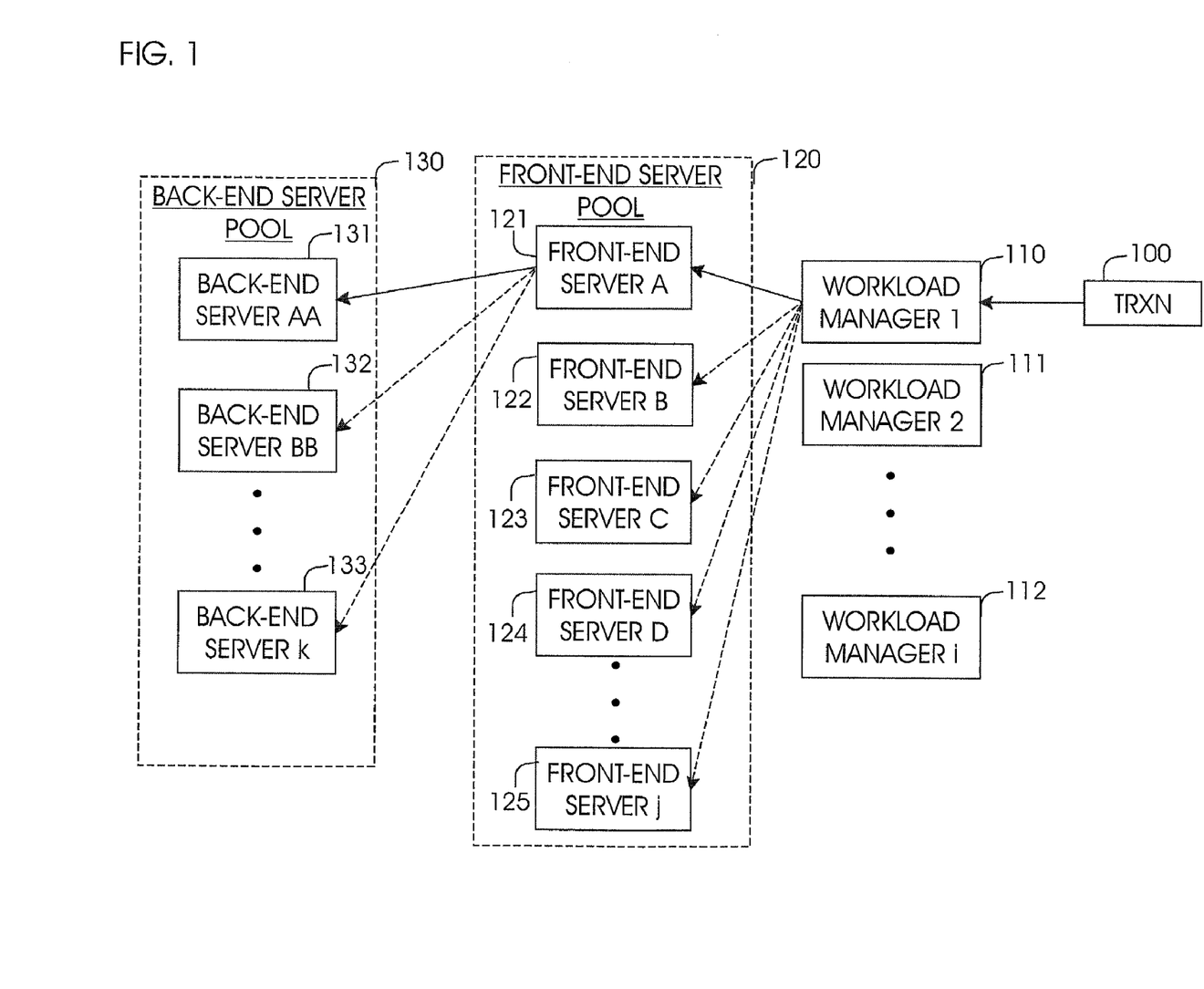
FIG. 1 is a high-level diagram illustrating one embodiment of apparatus for routing transactions to servers.

An embodiment for routing transactions 100 to servers is illustrated in the high-level diagram of FIG. 1. Generally, a transaction 100 (e.g., a request to process data) is received at one of a number of workload managers 110-112. The workload manager 110 may route the transaction 100 to one of a number of front-end servers 121-125. The front-end servers may access resources (e.g., a database) to process the transaction 100 from any number of back-end servers 131-133.

It is understood that the term "server" as used herein may be any computer or device that manages resources, such as a file server, a printer server, a network server, a database server, etc. In addition, the servers 121-125 and/or 131-133 may be partitioned (i.e., have multiprocessing capability), in which case the term "server" may instead refer to software that is managing resources rather than to an entire, individual computer or other hardware device. It is also understood that the terms "front-end" and "back-end" as used in relation to the term "server" are used merely to indicate the functional aspects of each. Indeed, one or more of the front-end servers 121-125 may also function as one or more back-end servers 131-133, for example, where the front-end server has the resources required for processing a transaction 100 and is accessed by other front-end servers for those resources.

A load balancing approach using the configuration shown in FIG. 1 may be illustrated using the "round-robin" approach. In this illustration, where the previous transaction was routed to front-end Server A (121), the workload manager 110 may route a current transaction 100 to front-end Server B (122). Likewise, the workload manager 110 may route the next transaction to front-end Server C (123), and so forth. However, according to such an approach, where one of the servers (e.g., front-end Server B (122)) is out-of-service or otherwise unavailable, the transaction 100 may be delayed or not be processed at all (e.g., the user may instead receive an error message).

Also according to this approach, similar transactions 100 may be routed to different front-end servers 121-125. For example, three similar transactions 100 requiring the same or similar resources from back-end Server BB (132) may be routed to front-end Server B (122), front-end Server C (123), and front-end Server D (124), respectively. As such, front-end Server B (122), front-end Server C (123), and front-end Server D (124) may each independently access back-end Server BB (132) to process these three transactions 100. Thus, there is an increased likelihood that more than one of the front-end servers 122, 123, and 124 may simultaneously access the back-end Server BB (132), which may slow the response time of the back-end Server BB (132).

Further according to this approach, similar resources accessed from back-end Server BB (132) may be separately stored in the cache of each of the three front-end servers 122, 123, and 124. When, for example, front-end Server C (123) then receives a transaction 100 requiring different resources from the back-end servers 131-133, the cache may need to be emptied or overwritten, at least in part, to accommodate these resources. However, front-end Server C (123) may then receive another transaction 100 similar to the first transaction 100, wherein the resources may again be accessed from the back-end Server BB (132) and again be rewritten to the cache of front-end Server C (123). If the back-end resources are large (e.g., a large database), then other useful front-end resources may be frequently overwritten, thus requiring additional back-end calls when these resources are once again needed. Furthermore, a large database, which is duplicated on several front-end servers, ties up significant memory resources.

As another illustration, using the "next available" approach, where the previous transaction was routed to front-end Server A (121), and where front-end Server B (122) is unavailable, the workload manager 110 may route an incoming transaction 100 to front-end Server C (123), and so forth. However, according to this approach, similar transactions 100 may still be routed to different front-end servers 121-125. For example, three similar transactions requiring resources from back-end Server BB (132) may be routed to front-end Server A (121), front-end Server C (123), and front-end Server D (124), respectively. Again, each of the front-end servers 121, 123, and 124 may independently access back-end Server BB (132) to process these three transactions 100. Again, there is an increased likelihood that more than one of the front-end servers 121, 123, and 124 may simultaneously access the back-end Server BB (132), which may slow the response time of the back-end Server BB (132). Also again, the cache of each of the front-end servers 121, 123, and 124 may not be efficiently utilized.

Yet another illustration may be used, by way of example, to understand the "fastest available" approach. In this illustration, front-end Server A (121), front-end Server B (122), and front-end Server C (123) are each available, but front-end Server A (121) is providing the fastest response time, front-end Server B (122) is providing the next fastest response time, followed by front-end Server C (123). As such, the workload manager 110 may route a first transaction 100 to front-end Server A (121). While front-end Server A (121) is processing the first transaction 100, the workload manager 110 may route a second transaction 100 to front-end Server B (122), and so forth. However, according to this approach, similar transactions 100 may still be routed to different front-end servers 121-125, and again experience the same inefficiencies as described above with respect to the first two approaches.

FIG. 2 is a high-level diagram illustrating another embodiment for routing transactions 100 to servers. The transaction 100 preferably comprises a tag 210 associated with a data packet 220 (e.g., the data to be processed). The tag 210 is preferably a single or multi-bit packet associated with the data packet 220, the value of which identifies an attribute-based category 410 (FIG. 4) for the transaction 100. The attribute-based category 410 preferably identifies the transaction 100 based on the transaction 100 itself. For example, the attribute-based category may identify the transaction 100 based on the originating software application, the resources required to process the transaction 100, a combination of attributes, etc. The transaction 100 may be received by the workload manager 110, and based at least in part on the attribute-based category 410 thereof, the workload manager 110 may identify at least one of the front-end servers 121-125 to process the transaction 100. For example, when the transaction 100 has been assigned the attribute-based category 410 "spreadsheet transaction" (i.e., a "real" attribute, as further explained below), the workload manager 110 (or a suitable agent for use therewith) may identify front-end Server C (123) that is assigned to process transactions 100 having the attribute-based category 410 of "spreadsheet transaction". In addition to the attribute-based category 410, the workload manager 110 may also route the transaction 100 based on other factors, such as the load on one or more of the front-end servers 121-125, response time, the availability thereof, etc. Once identified, the workload manager 110 may route the transaction 100 to the identified server (e.g., front-end Server C (123)). As such, similar transactions 100 may be routed to the same front-end server(s) 121-125, so that the front-end server(s) 121-125 are able to process the transactions 100 faster and more efficiently (e.g., by using resources which are already loaded into the cache memory of the front-end servers 121-125).

The attribute-based category 410 may be based on "real" and/or "perceived" attributes of the transaction 100. The real attributes may be based on the originating application, or some other attribute of the transaction itself (e.g., application type, transaction type, requested data, file extension, etc.). The perceived attributes may be based on the premise that, for example, User A (e.g., a marketing representative) typically generates transactions of category A, User B (e.g., an accountant) typically generates transactions of category B, and so forth. Other examples of perceived attributes may include, but are not limited to, originating computer, originating department, prior transactions of a particular user, etc.). Although there may be an inherent error rate associated with perceived attributes (i.e., the transaction may be routed incorrectly a percentage of the time), the error rate declines as perceived attributes are chosen more carefully.

It is understood that the data packet 220 may include any data that is to be processed in any number of ways. Preferably, the data packet 220 is a database access request. However, the data packet 220 may comprise any work packet or work request. For example, the data packet 220 may include an email message to be delivered to a recipient, a uniform resource locator (URL) requesting a hypertext markup language (HTML) page from the corresponding Internet site, data to be stored in a network area storage (NAS) device, spreadsheet data for tabulation, a portion thereof to be reassembled upon reaching the network device, etc. Optionally, the transaction 100 may also include additional fields. For example, the transaction 100 may include a destination (not shown) identified by an IP address, such as the pool of servers 120.

It is also understood that the tag 210 and the attribute-based category 410 identified thereby may take any suitable form. The tag 210 may be a numeric value. For example, the tag 210 may be a bit value (e.g., "one" or "zero" or a combination thereof). Or for example, the tag 210 may comprise meta data defining the attribute-based category 410. It is further understood that the attribute-based category 410 may be defined using a plurality of packets or tags 210. Similarly, an individual tag 210 may comprise more than one indicator for defining the attribute-based category 410, which may be combined to indicate the attribute-based category 410. In such an embodiment, the attribute-based category 410 may be defined based on a combination of some or all of the indicators included therein. For example, the workload manager 110 may categorize a transaction 100 as "marketing-data entry" where the tag 210 comprises an employee ID (e.g., "DE-9999"). Preferably, however, the attribute-based category 410 is assigned for a class of users, or a work request that has an affinity to a specific segment of data, and indicates or specifies the resources that are required by the class of users or work request so that the workload manager (e.g., an agent thereof) may determine which front-end servers 121-125 are best able to process the transaction 100 (i.e., fulfill the requested task).

It is further understood that the configuration shown in FIG. 2 is merely illustrative of the apparatus and method of the present invention and is not intended to limit the scope of the invention. Other configurations are also contemplated as being within the scope of the invention. For example, multiple workload managers 110 may be networked to administer one or more server pools (e.g., 120, 130) or multiple server pools (not shown). Such a configuration allows a workload manager 110 experiencing heavy use to transfer some or all of the transactions 100 in bulk to another workload manager (e.g., 111) experiencing a lighter load. Or for example, a hierarchy of workload managers (not shown) might administer one or more server pools (e.g., 120, 130). A possible hierarchical configuration may comprise a gate-keeping workload manager that directs the transactions 100 to a workload manager monitoring the servers for the marketing department, to a workload manager monitoring servers for the accounting department, and so forth, wherein the workload managers for each department may then select a server from the group or pool of servers 120, 130 for the respective departments.

Figure 3:
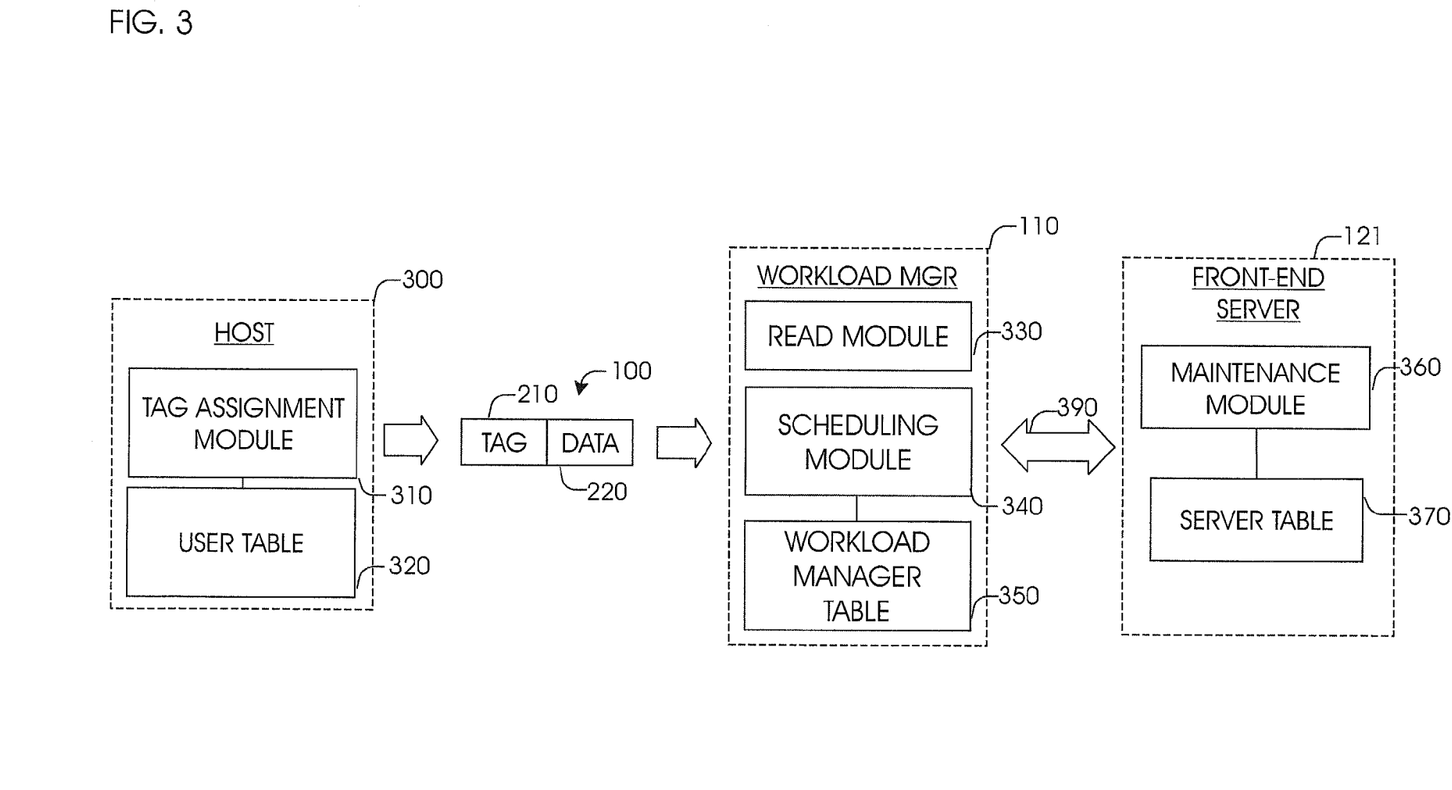
FIG. 3 is a high-level process flow diagram illustrating an embodiment of apparatus for routing transactions to servers.

FIG. 3 is a high-level process flow diagram illustrating an embodiment for routing transactions 100 to servers. The transaction 100 preferably originates at a host 300 (e.g., a user workstation or PC), where it is assigned an attribute-based category 410. For example, the tag assignment module 310 may access a user table 320 to define an attribute-based category 410 for the transaction 100 based on one or more attributes thereof, and associate a tag 210 defining the attribute-based category 410 with the transaction 100. The transaction 100 may then be transmitted over the network to a workload manager 110. Upon receiving the transaction 100, the workload manager 110 may identify the attribute-based category 410 for the transaction 100, for example, by reading the tag 210 using suitable program code (e.g., the read module 330). Based at least in part on the identified attribute-based category 410 for the transaction 100, the workload manager 110 may identify a front-end server (e.g., 121) assigned to process the identified category of transactions 100. For example, the routing module 340 may access a workload manager table 350 that identifies which of the front-end server(s) 121-125 are assigned to the identified attribute-based category 410 of the transaction 100. The workload manager 110 may then route 390 the transaction 100 to one of the identified front-end servers 121-125.

It is understood that the attribute-based category 410 may be assigned to the transaction 100 in any suitable manner. As an example, in one embodiment the tag assignment module 310 may be used to manually assign the attribute-based category 410 to the transaction 100. According to this embodiment, an administrator may define the attribute-based category 410. For example, the administrator may assign one or more attribute-based categories 410 to transactions originating from a particular workgroup, user, project, application, etc. Alternately, a user may define the attribute-based category 410 with suitable program code (e.g., via a user interface) included at a network device (e.g., a workstation, router, etc.) or as part of an application (e.g., an operating system, the originating application, an applet, etc.). For example, the user may be queried before starting a software application as to the attribute-based category 410 to be assigned to the transactions 100 originating therefrom. The user might have predefined options (e.g., a menu, list, etc.). Or the user may specify an attribute-based category (e.g., using predefined commands or command strings).

As another example, in another embodiment the tag assignment module 310 may automatically assign the attribute-based category 410 to the transaction 100. That is, the attribute-based category 410 may be assigned directly by the tag assignment module at a network device (e.g., a workstation, router, etc.) or as part of an application (e.g., an operating system, the originating application, an applet, etc.). The attribute-based category 410 may be assigned based on a fixed parameter (e.g., a user login ID), a dynamic parameter (e.g., the application generating the transaction which may change for various tasks), or a combination thereof.

As yet another example, in another embodiment the attribute-based category 410 may be assigned through a combination of manual and automatic identification. For example, the user may define the attribute-based category 410, and the transaction 100 may be automatically marked with additional category information, such as an application ID. In such an embodiment, the transaction 100 may be handled based on the user-defined category, the automatic markings, or a combination thereof.

Preferably, program code for maintaining the category assignments for the front-end servers 121-125 is also provided, as illustrated using the maintenance module 360 in FIG. 3. The maintenance module 360 for assigning and deallocating attribute-based categories 410 for each of the front-end servers 121-125 may be provided at the front-end servers 121-125 or provided to interact therewith. In one embodiment, the category or categories 410 assigned to one or more of the front-end servers 121-125 may be recorded in a server table 370 (also see FIG. 6). When a transaction 100 is received at one of the front-end servers 121-125, or after it is processed, the maintenance module 360 may determine whether the attribute-based category 410 associated with the transaction 100 is already identified for the front-end server (e.g., 121), or if it is a new category that has not yet been assigned. Where the front-end server (e.g., 121) has not previously, or has not recently, processed a transaction 100 so categorized, the maintenance module 360 may determine that the attribute-based category 410 is new. As such, the server table 370 may be updated to indicate that the front-end server (e.g., 121) is now classified for, or has been assigned to process other transactions 100 of the same attribute-based category 410. In addition, the maintenance module 360 may also broadcast the new server assignment to each of the workload manager(s) 110, which may in turn update the workload manager table 350 to indicate to the workload manager 110 that the front-end server (e.g., 121) is classified for processing other transactions 100 assigned the same attribute-based category 410.

In another embodiment, the server table 370 (also see FIG. 6) may record the time elapsed since the front-end server (e.g., 121) last processed a transaction 100 of a particular attribute-based category 410, and the state of that category (e.g., whether it is active or inactive). Preferably, each time the front-end server (e.g., 121) processes a transaction 100, the maintenance module 360 updates the server table 370 to indicate the time that the transaction 100 was processed and the attribute-based category 410 of the transaction 100 that was processed. On a recurring basis (e.g., periodically or continuously), the maintenance module 360 may inventory the state of each attribute-based category 410 that is assigned to the server as recorded by the server table 370. When a transaction 100 of a particular attribute-based category 410 has not been processed within a predetermined time interval (e.g., "Δt"), that attribute-based category 410 may be considered inactive. As such, the maintenance module 360 may deallocate the attribute-based category 410. That is, the server table 370 may be updated to indicate that the front-end server (e.g., 121) is no longer classified for processing other transactions 100 of that attribute-based category 410. Likewise, the maintenance module 360 may broadcast the state of the attribute-based category 410 on the front-end server (e.g., 121) to the workload manager(s) 110 for updating the workload manager table(s) 350 accordingly. As such, the workload manager(s) 110 may appropriately route other transactions 100 (e.g., to another front-end server 122).

Preferably, the various modules 310, 330, 340, and 360 are embodied in computer readable program code. The computer readable program code may comprise program code for implementing a number of commands for executing the various tasks, as described herein. The following examples are illustrative of such commands. In the following, "TAG" is a programmable abbreviation for "tag 210", and "FES" is a programmable abbreviation for "front-end server".

Inquire (TAGid, FESid/*)

The Inquire command preferably displays all of the attribute-based categories 410 and associated front-end servers 121-125 which are assigned the respective attribute-based categories 410. The "*" command may be used to display all of the attribute-based categories 410 in use.

Reset Tag (TAGid Old, FESid Old, TAGis New, FESid New)

The Reset Tag command preferably resets the tag from "FESid_old" to "FESid_new" or may be used to replace the TAGid for a specific FESid, for example, where an incorrect TAGid was set.

Assign (TAGid, FESid)

The Assign command preferably assigns an attribute-based category 410 to one or more of the front-end servers. This command may be used whenever a new front-end server is assigned, or a new attribute-based category 410 is created.

Delete (TAGid, FESid)

The Delete command preferably deletes the FESid associated the TAGid. If the TAGid field is *, then all TAGids that are associated with the specified FESid are deleted. This may be used when the front-end server is inaccessible (e.g., due to a network or system failure).

Broadcast (TAGid, FESid, Mode)

The Broadcast command is preferably used to send the identity of the front-end server (i.e., identified by FESid) to all of the workload managers 110. The workload managers 110 may interpret the command as an Assign(TAGid,FESid) command (see above). Preferably, the front-end server uses the Broadcast command when a TAGid is assigned to a new front-end server. The mode command may be used to indicate whether the command is an "add" or "delete" command. An error message is preferably returned if the result is illogical, such as when an attempt is made to add an existing FESid.

Create TAG/FES Table (n); n=Number of Entries

The Create command establishes the data to notify the workload managers 110 of the front-end servers 121-125 that are available to process the attribute-based category 410. This data may be sent to the front-end servers 121-125 and be propagated or broadcast to all of the workload managers 110, in addition to being written on shared disk for access thereby.

Create Association (TAG, FES List)

The Create Association command makes a front-end server eligible to process transactions 100 of a particular attribute-based category 410 when a new front-end server is added to the server pool 120.

Delete (TAGid)

The Delete command sends an instruction to perform a Delete command at each of the workload managers 110. This command may be used when requests for the attribute-based category 410 have not been received for a period of time, and the memory used by attribute-based category 410 is deleted from cache to free memory.

It is understood that the exemplary commands given above are merely provided to illustrate various commands that may be used with the various modules 310, 330, 340, and 360. These commands are not intended to limit the scope of the invention in any way thereto. For example, other commands not described herein may also be programmed for various functional aspects of the various modules 310, 330, 340, and 360.

Figure 4:
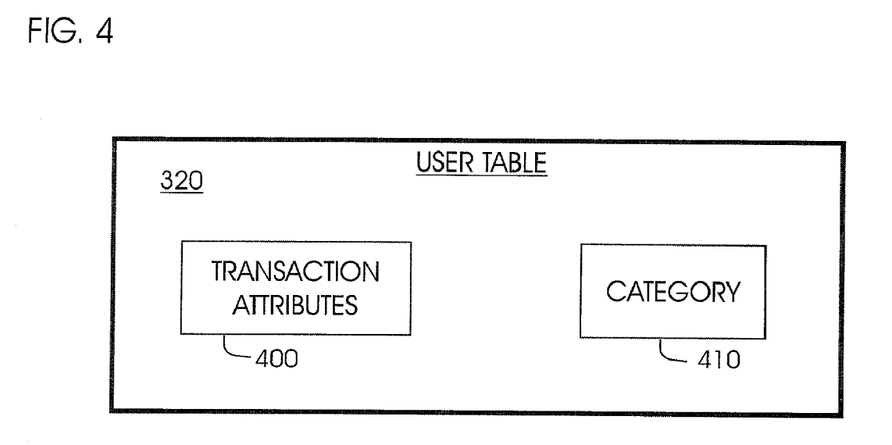
FIG. 4 is illustrative of an exemplary user table for routing transactions to servers.

FIG. 4 is illustrative of an exemplary user table 320 for assigning an attribute-based category 410 to a transaction 100 for routing it to the servers. The user table 320 may comprise a field for transaction attributes 400, and a field for transaction attribute-based categories 410. For example, the transaction attributes 400 may comprise the originating terminal or application, the originating user, etc. The transaction attributes 400 preferably correspond to various categories. For example, where the transaction 100 originated in the marketing department, the corresponding attribute-based category 410 may be "marketing". Or for example, where the transaction 100 originated in the accounting department using a spreadsheet, the corresponding attribute-based category 410 may be "accounting records". Preferably, the attribute-based category 410 is associated with the transaction 100, as explained above in more detail, by associating a tag 210 therewith.

Figure 5:
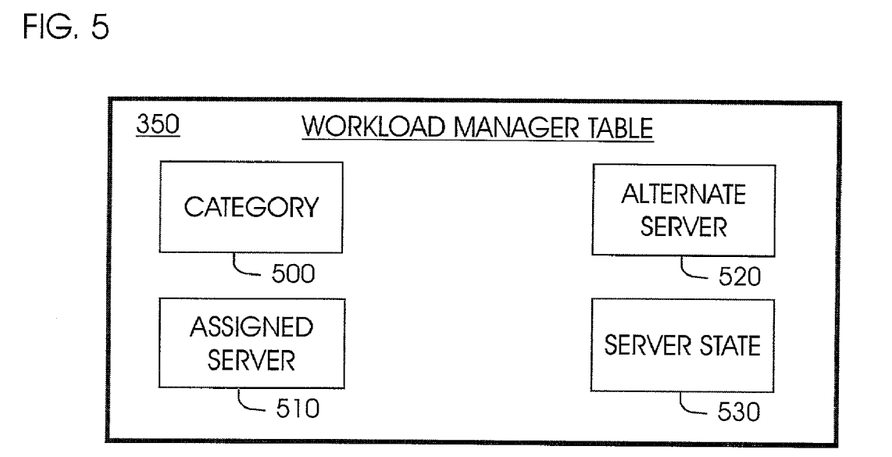
FIG. 5 is illustrative of an exemplary workload manager table for routing transactions to servers.

FIG. 5 is illustrative of an exemplary workload manager table 350 for routing transactions 100 to the servers. The workload manager table 350 may comprise a field 500 for indicating the category assigned to one or more of the front-end servers 121-125 listed in the server field 510. In addition, the workload manager table 350 may comprise a server state field 530 for indicating whether the front-end server(s) 121-125 are available (e.g., "on") or unavailable (e.g., "off") (e.g., when the physical and/or data resources are unavailable). Preferably, a field 520 is also provided for identifying alternate servers for processing transactions based on the attribute-based category 410 thereof. The workload manager 110 may access the workload manager table 350 to select the appropriate front-end server(s) 121-125.

Preferably, a failure notification module (e.g., part of maintenance module 360) is provided to notify the workload manager 110 when a server is unavailable. Preferably, the failure notification module at the failed server (e.g., 122) notifies another front-end server (e.g., 123) (e.g., using a pre defined sequence) so that it may, in turn, notify the workload manager 110 that the server (e.g., 122) is unavailable. When the workload manager 110 is notified that a front-end server (e.g., 122) is unavailable, the workload manager 110 preferably deletes each tab entry in the workload manager table 350 that references the unavailable front-end server (e.g., 122). Preferably, a network connectivity failure or server failure would be handled the same.

Other embodiments of the workload manager table 350 may comprise more than one data table for one or more of the fields, thus simplifying processing thereof. As an illustration, The workload manager table 350 may be separated into an Eligible Server Table (e.g., Table 1), and an Active Load Server Table (e.g., Table 2).

TABLE 1

| TAG | Capable Front-End Server | State |
| --- | --- | --- |
| Category A | Front-End Server 1, 3, 5, . . . n | On |
| Category B | Front-End Server 2, 5, . . . n | Off |
| . . . | . . . | . . . |
| Category n | Front-End Server n | Off |

The Eligible Server Table (e.g., Table 1) may be used to track each category that may potentially be identified by a tag for a transaction, each front-end server that is capable of processing such a transaction, and the state of each of the categories and/or servers.

TABLE 2

| TAG | Assigned FES | Alternate FES |
| --- | --- | --- |
| Category A | Front-End Server 1 | Front-End Server 3 |
| Category D | Front-End Server 5 | Front-End Server 1 |

The Active Load Server Table (e.g., Table 2) on the other hand, may be used to track server assignments only for active categories (i.e., categories assigned to transactions that are actively being processed). Accordingly, the Active Load Server Table is typically shorter and more readily processed.

Figure 6:
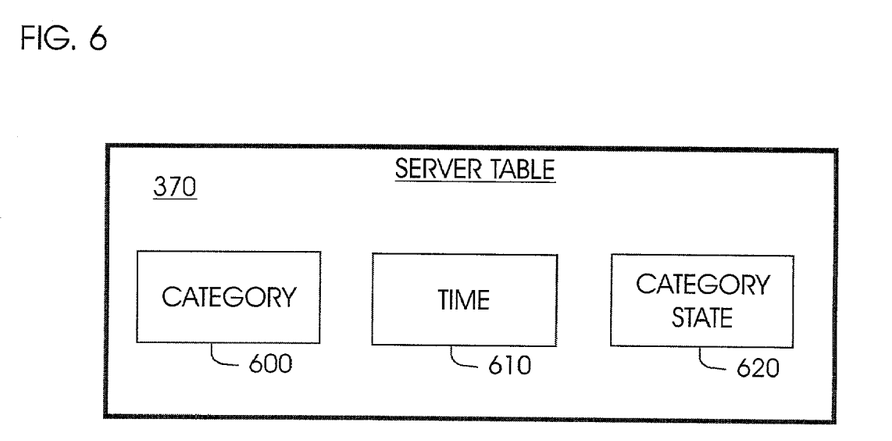
FIG. 6 is illustrative of an exemplary server table for routing transactions to servers.

FIG. 6 is illustrative of an exemplary server table 370 for routing transactions 100 to servers. The server table 370 preferably comprises a field 600 identifying the categories assigned to the front-end servers 121-125, a time field 610, and a category state field 620. Preferably, each time a transaction 100 is processed by a front-end server (e.g., 121), the time is updated in field 610 for the category thereof. As such, the maintenance module 360 can determine whether the category is active or inactive (e.g., based on a predetermined time, as discussed above). The state field 620 may indicate whether the category is active or inactive for the front-end server. The server table 370 may be a shared file for access by each of the front-end servers 121-125. Alternately, the server table 370 may be stored at each of the front-end servers 121-125.

Preferably, a recovery component (e.g., as part of maintenance module 360) is also provided to reestablish the server table 370 (e.g., upon start-up, or when a server is otherwise returned to service). The recovery module may create a log of all changes to the server table 370. When the server table 370 comprises multiple files on a shared disk, the recovery component preferably scans each disk for the current state of the server table 370 and maintains the log. Hence, when a server table 370 becomes corrupt, or needs to be reestablished for any other reason, the recovery component may reestablish the server table 370 based on the log.

Figure 7:
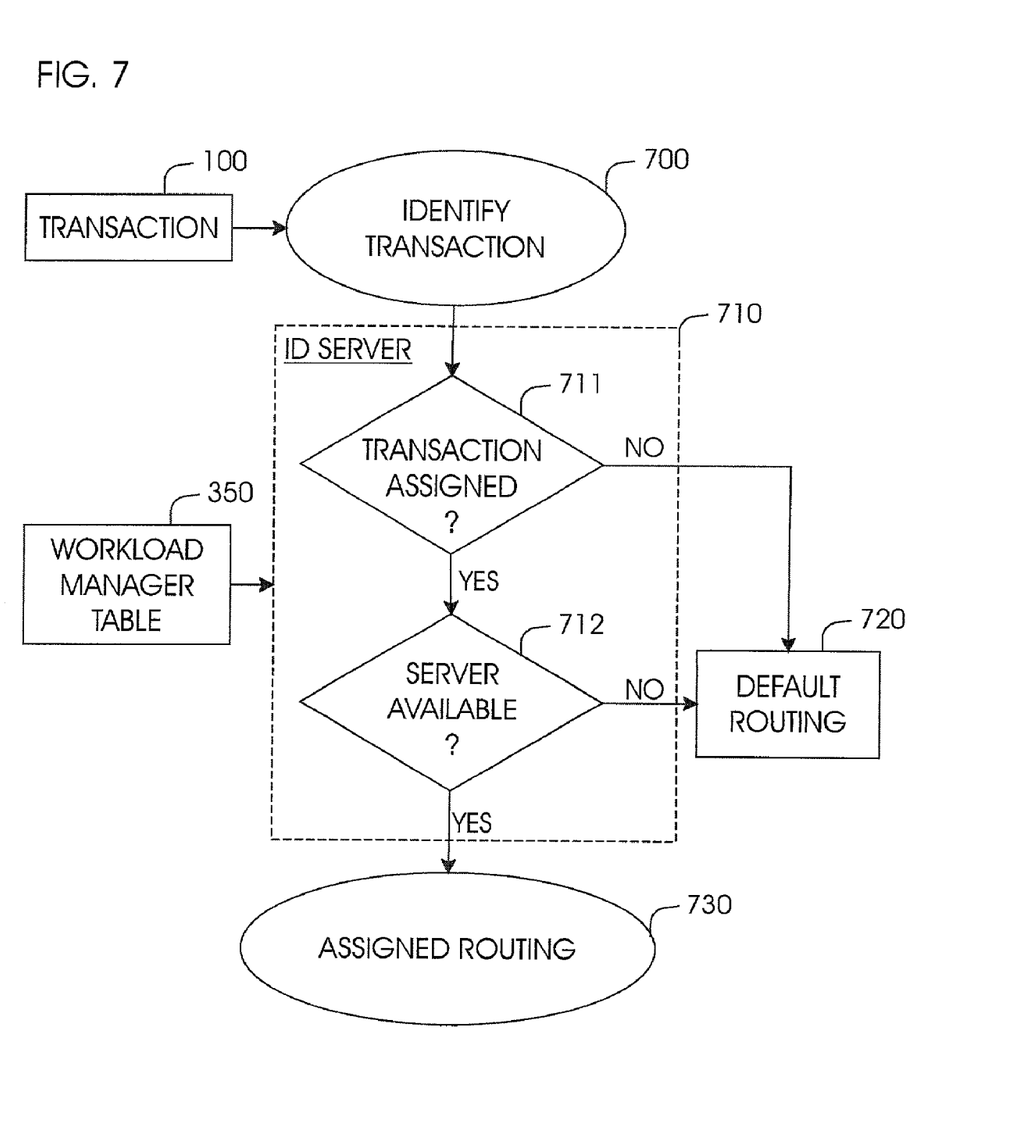
FIG. 7 is a flow diagram illustrating steps of an embodiment of a method for routing transactions to servers.

FIG. 7 is a flow diagram illustrating steps of an embodiment for routing transactions to servers. In step 700, the transaction 100 is identified. For example, the transaction 100 may be identified at the workload manager 110 by reading the tag 210 associated therewith. As explained above, the tag 210 may indicate one or more attribute-based categories for the transaction 100. In step 710, at least one of the front-end servers 121-125 is identified. Preferably, the front-end server is identified based at least in part on the identified attribute-based category of the transaction 100, for example, as indicated by the tag 210 and using the workload manager table 350. Identifying the server in step 710 may also comprise determining whether the transaction 100 is assigned to one or more servers in step 711. Where the transaction 100 is not assigned to at least one of the servers, the transaction may be routed by default to one of the front-end servers 121-125 for processing in step 720. For example, the transaction 100 may be routed by to the next available or the fastest of the available front-end servers 121-125 in step 720. Where the transaction 100 is assigned to a front-end server (e.g., 121), the workload manager determines whether the assigned front-end server (e.g., 121) is available, in step 712. When the assigned front-end server (e.g., 121) is not available, the workload manager 110 routes the transaction 100 by default to one of the other front-end servers (e.g., 122-125) for processing in step 720. However, where the assigned front-end server (e.g., 121) is available, the workload manager 110 routes the transaction 100 to the assigned front-end server (e.g., 121) in step 730.

It is understood that the steps of the method shown in FIG. 7 are merely illustrative of one embodiment thereof, and other embodiments are also contemplated as being within the scope of the invention. In another embodiment, for example, the method may further comprise assigning an attribute-based category to the transaction 100 (e.g., associating a tag 210 therewith), and identifying the transaction 100 and one of the front-end servers 121-125 based on the assigned attribute-based category. In another embodiment, for example, the transaction 100 may be held in a queue (not shown) until the identified front-end server is available, instead of providing default routing in step 720.

Figure 8:
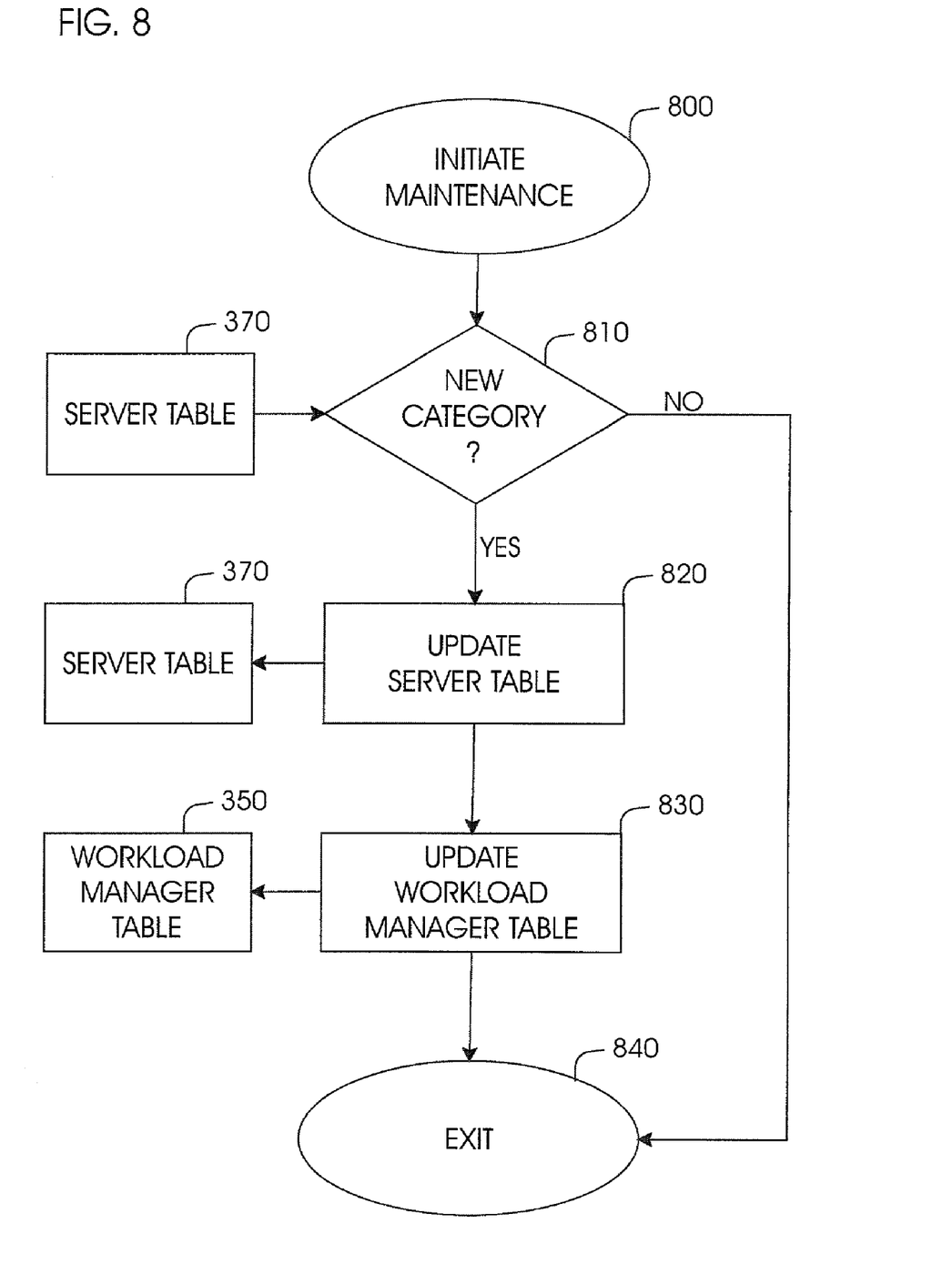
FIG. 8 is a flow diagram illustrating steps of another embodiment of a method for routing transactions to servers.

FIG. 8 is a flow diagram illustrating steps of an embodiment for routing transactions 100 to servers. In step 800, a maintenance routine may be initiated. For example, the front-end servers 121-125 may initiate the maintenance routine after processing transaction 100. The maintenance routine may determine whether the attribute-based category associated with the transaction 100 is new, as in step 810. Where the attribute-based category is not a new category, the maintenance routine may exit in step 840. Alternately, the attribute-based category may be a new category. For example, the attribute-based category may be a new category where one or more of the front-end servers 121-125 have not previously, or has not recently, processed a transaction 100 so categorized, as recorded in the server table 370. As such, where the attribute-based category is new, the maintenance routine moves the contents to the active load server table 370 in step 820 to indicate that one or more of the front-end servers 121-125 are classified for processing other transactions 100 so categorized. Likewise, the maintenance routine may also update the workload manager table 350 in step 830 to indicate to the workload manager(s) that one or more of the front-end servers 121-125 are classified for processing other transactions so categorized. The workload managers are also notified. Once the workload manager table 350 and the server table 370 are updated, the maintenance routine may exit in step 840.

It is understood that the steps of the method shown in FIG. 8 are merely illustrative of one embodiment thereof, and other embodiments are also contemplated as being within the scope of the invention.

Figure 9:
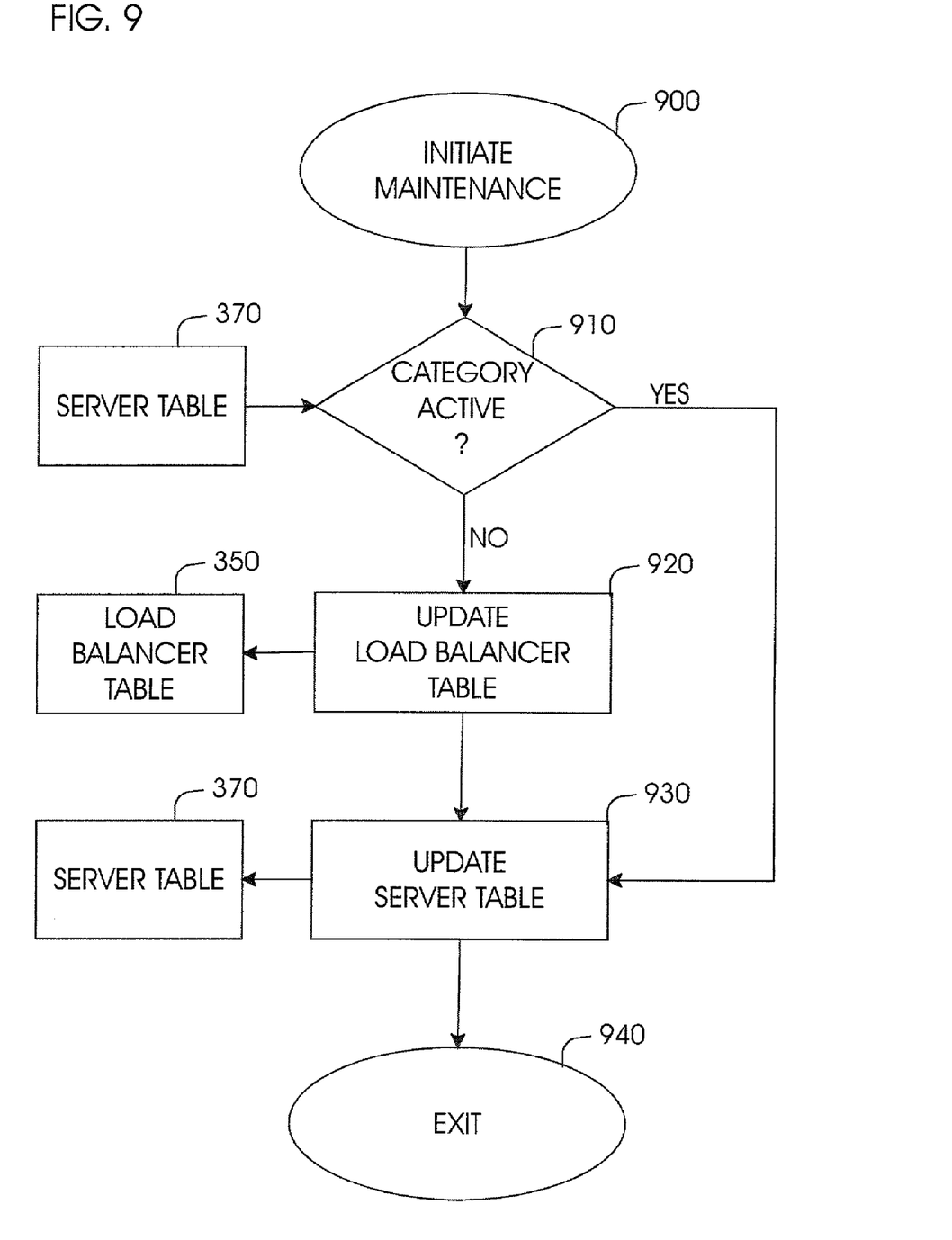
FIG. 9 is a flow diagram illustrating steps of yet another embodiment of a method for routing transactions to servers.

In some circumstances, the same task may be scheduled on different application servers. This is known as a "race condition" and may be handled according to embodiments of the invention as shown in FIG. 9. In step 900, a maintenance routine may be initiated. For example, the front-end servers 121-125 may initiate the maintenance routine after processing transaction 100. The maintenance routine may determine whether the category associated with the transaction 100 is active, as in step 910. Where the attribute-based category is active, the maintenance routine may proceed to update the server table 370 in step 930, and exit in step 940. Alternately, the attribute-based category may be inactive. For example, a predetermined time may have elapsed since one of the front-end servers 121-125 last processed a transaction 100 so categorized, as recorded in the server table 370. As such, where the attribute-based category is inactive, the maintenance routine may deallocate the category. That is, the maintenance routine may update the workload manager table 350 in step 920 to indicate that one of the front-end servers 121-125 is no longer classified for processing other transactions 100 so categorized. Likewise, the maintenance routine may also update the server table 370 in step 930 to indicate to the workload manager(s) that one of the front-end servers 121-125 is no longer classified for processing other transactions so categorized. Once the workload manager table 350 and the server table 370 are updated, the maintenance routine may exit in step 940.

It is understood that the steps of the method shown in FIG. 9 are merely illustrative of one embodiment thereof, and other embodiments are also contemplated as being within the scope of the invention.

Figure 10:
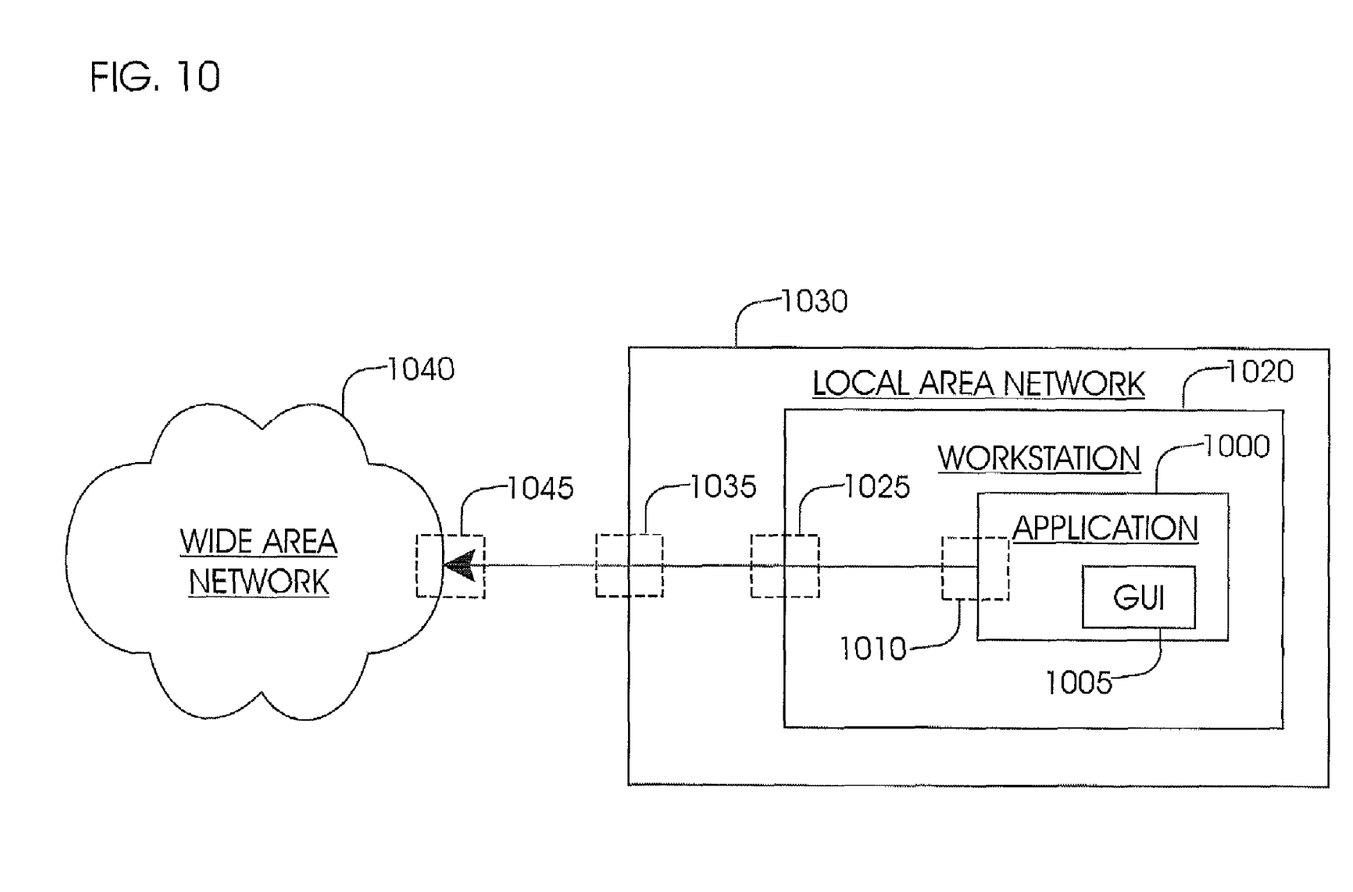
FIG. 10 is a high-level diagram of a network illustrating various points thereon at which an attribute-based category may be assigned to a transaction.

FIG. 10 is a high-level diagram of a network illustrating various points thereon at which an attribute-based category (e.g., tag 210) may be assigned to the transaction 100. For example, the tag 210 may be assigned to the transaction 100 at the originating application 1000 via a graphical user interface (GUI) 1005 or via other suitable program code 1010 integrated as part of the application or interacting therewith. Or for example, the tag 210 may be assigned at a workstation 1020 via the operating system (OS) 1025 or other suitable program code executed on the workstation 1020. In another example, the tag 210 may be assigned on the local area network 1030 by a network component 1035 (e.g., a server, another workstation, a router, hub, etc.), and/or on the wide area network 1040, also by a network component 1045.

It is understood that the attribute-based category (e.g., tag 210) may be assigned to the transaction 100 at any number of points, and FIG. 10 is merely intended to be an illustration thereof. Other examples include assigning the tag 210 to the transaction 100 by an intermediary computer, a gateway, a workload manager, etc. Another example may include dynamically assigning the tag 210. That is, the tag 210 may be assigned to the transaction 100 at the originating application 1010, then appended at the operating system 1025, and further changed at a router 1035 and/or 1045 on the network 1030 and/or 1040 before the transaction 100 reaches the destination. As an illustration, the user (e.g., via GUI 1005) may input employee identification for categorizing the transaction 100. The operating system 1025 may subsequently append an attribute-based category to the transaction 100, further categorizing the transaction by originating terminal. A router 1035 and/or 1045 that receives the transaction 1000 may then change the tag, based on the employee ID and the originating terminal, to categorize the transaction as originating in the marketing department. As such, the tag 210 need not be statically assigned.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for routing a transaction to a front-end server, comprising:
identifying at least one attribute-based category for said transaction;
attempting to identify at least one of a plurality of front-end servers to process said transaction based at least in part on said identified attribute-based category of said transaction and at least in part on said front-end servers being assigned to execute transactions corresponding to said attribute-based category;
when at least one of the front-end servers is identified, routing said transaction to one of said at least one identified front-end server;
when no front-end server is identified, routing said transaction to a default one of the front-end servers;
determining whether the transaction is associated with a new attribute-based category, and if so, assigning the new attribute based category to one of the front end servers;
wherein identifying said at least one front-end server comprises comparing said attribute-based category for said transaction to assigned attribute-based categories for said plurality of front-end servers.

2. A method as in claim 1, further comprising assigning said at least one attribute-based category to said transaction.

3. A method as in claim 2, wherein assigning said at least one attribute-based category to said transaction comprises associating a tag with said transaction.

4. A method as in claim 1, further comprising determining whether said at least one front-end server is available for processing said transaction.

5. A method as in claim 1, further comprising rerouting said transaction to another of said plurality of front-end servers when said identified server refuses said transaction.

6. A method as in claim 1, further comprising notifying a workload manager of said at least one front-end server assigned to said new attribute-based category.

7. A method as in claim 1, wherein identifying said at least one attribute-based category for said transaction comprises identifying a "perceived" attribute of said transaction.

8. A method as in claim 7, wherein the identified "perceived" attribute is the computer originating the transaction.

9. A method as in claim 7, wherein the identified "perceived" attribute is the user originating the transaction.

10. A method as in claim 7, wherein the identified "perceived" attribute is a class of users from which the transaction originates.

11. A method as in claim 1, further comprising:
routing said transaction to one of said at least one identified front-end servers; and
one or more of said front-end servers,
maintaining its own table of attribute-based categories for transactions that it has processed;
for each attribute-based category in its table, maintaining an indication of when a transaction corresponding to the attribute-based category was last processed by the front-end server; and
after a predetermined time of not processing a transaction corresponding to an attribute-based category in its table, broadcasting an indication of this event to a plurality of workload managers that can route transactions to the front-end server.

12. A method as in claim 11, further comprising:
upon a worklbad manager's receipt of said broadcast indication, the workload manager updating its own table of assignments between attribute-based categories and front-end servers.

13. An apparatus for routing a transaction to a front-end server, comprising:
computer readable storage media; and
computer readable program code stored on said computer readable storage media, comprising:
program code for attempting to identify at least one attribute-based category for said transaction;
program code for identifying at least one of a plurality of front-end servers to process said transaction based at least in part on said identified attribute-based category of said transaction and at least in part on said front-end servers being assigned to execute transactions corresponding to said attribute-based category;
program code for, when at least one of the front-end servers is identified, routing said transaction to one of said at least one identified front-end server;
program code for, when no front-end server is identified,
routing said transaction to a default one of the front-end servers;
determining whether the transaction is associated with a new attribute-based category; and
assigning the new attribute-based category to one of the front-end servers;
program code for assigning a number of attribute-based categories to each of said plurality of front-end servers, wherein said program code for routing said transaction to one of said identified front-end servers routes said transaction according to said assigned attribute-based categories;
program code for determining a status for each of said assigned attribute-based categories; and
program code for deallocating said assigned attribute-based categories when said status thereof is inactive.

14. An apparatus as in claim 13, further comprising program code for assigning said at least one attribute-based category to said transaction.

15. An apparatus as in claim 13, wherein said attribute-based category is based on at least one "real" attribute of said transaction.

16. An apparatus as in claim 13, wherein said attribute-based category is based on at least one "perceived" attribute of said transaction.

17. An apparatus as in claim 13, further comprising a user table for assigning said at least one attribute-based category to said transaction.

18. An apparatus as in claim 13, further comprising:
program code for determining whether said at least one identified server is available for processing said transaction; and
program code for rerouting said transaction to another of said plurality of servers when at least one identified server is unavailable for processing said transaction.

19. An apparatus as in claim 13, wherein said program code for assigning at least one attribute-based category to each of said plurality of servers bases the assignment at least in part on an affinity of transaction attributes.

20. An apparatus as in claim 13, further comprising a workload manager table for recording said assigned attribute-based categories.

21. An apparatus as inclaim 13, further comprising program code to update, in response to broadcast indications from said front-end servers, a table of which attribute-based categories are assigned to which front-end servers, said table being maintained by and for a particular workload manager.

* * * * *

UNITED STATES PATENT AND TRADEMARK OFFICE
CERTIFICATE OF CORRECTION

PATENT NO.         : 7,376,953 B2
APPLICATION NO.    : 10/020355
DATED              : May 20, 2008
INVENTOR(S)        : Shinobu Togasaki It is certified that error appears in the above-identified patent and that said Letters Patent is hereby corrected as shown below:

In column 9, line 53, delete "TAGis New" and insert -- TAGid_NEW --, therefor.

In column 14, line 51, in Claim 1, delete "front end" and insert -- front-end --, therefor.

In column 15, line 2, in Claim 6, after "said" delete "at least one".

In column 15, line 30, in Claim 12, delete "worklbad" and insert -- workload --, therefor.

In column 16, line 46, in Claim 21, delete "inclaim" and insert -- in claim --, therefor.

Signed and Sealed this

Twenty-ninth Day of July, 2008

JON W. DUDAS
*Director of the United States Patent and Trademark Office*